(12) United States Patent
Kraus et al.

(10) Patent No.: US 7,434,601 B2
(45) Date of Patent: Oct. 14, 2008

(54) CLEANING AND/OR INSPECTING ROBOT FOR HAZARDOUS ENVIRONMENTS INCLUDING CATALYST REMOVAL

(75) Inventors: Greg Kraus, League City, TX (US); Ray Arnold, Dickinson, TX (US)

(73) Assignee: Catalyst Services, Inc., Deer Park, TX (US)

( * ) Notice: Subject to any disclaimer, the term of this patent is extended or adjusted under 35 U.S.C. 154(b) by 364 days.

(21) Appl. No.: 10/743,921

(22) Filed: Dec. 23, 2003

(65) Prior Publication Data

US 2004/0134518 A1    Jul. 15, 2004

Related U.S. Application Data

(60) Provisional application No. 60/436,121, filed on Dec. 23, 2002.

(51) Int. Cl.
*B65B 1/04* (2006.01)
*B08B 3/00* (2006.01)

(52) U.S. Cl. ................ 141/85; 141/65; 141/256; 134/169 C (58) Field of Classification Search .............. 141/1, 141/8, 65, 85, 256; 134/166 C, 169 C; 37/317, 37/321, 324, 189; 210/170
See application file for complete search history.

(56) References Cited

U.S. PATENT DOCUMENTS

| | | | |
|---|---|---|---|
| 3,718,367 A * | 2/1973 | Schumacher | 299/14 |
| 3,916,960 A | 11/1975 | Thompson | |
| 3,930,324 A * | 1/1976 | Wightman et al. | 37/189 |
| 4,312,762 A * | 1/1982 | Blackburn et al. | 210/768 |
| 5,204,517 A | 4/1993 | Cates et al. | |
| 5,228,484 A | 7/1993 | Johnson | |
| 6,145,517 A * | 11/2000 | Mancuso | 134/22.1 |
| 6,360,786 B1 | 3/2002 | Fry | |
| 6,431,224 B1 | 8/2002 | Fry | |

OTHER PUBLICATIONS

Timothy L. Maust, International Search Report, form PCT/ISA/210, Apr. 26, 2004 (one page).

* cited by examiner

*Primary Examiner*—Timothy L Maust
(74) *Attorney, Agent, or Firm*—Mark A. Oathout (57) ABSTRACT

A vacuum line connected to a robotic device is run into a reactor vessel. The robotic device has a rotating body, a cleaning arm, and stabilizing arms to stabilize the robotic device within the reactor vessel. The robotic device may be controlled/monitored from a remote control station in communication with the robotic device.

4 Claims, 8 Drawing Sheets

CLEANING AND/OR INSPECTING ROBOT FOR HAZARDOUS ENVIRONMENTS INCLUDING CATALYST REMOVAL

CROSS-REFERENCE TO RELATED APPLICATIONS

This application claims the benefit of U.S. provisional application No. 60/436,121 filed Dec. 23, 2002.

REFERENCE TO A MICROFICHE APPENDIX

Not applicable.

STATEMENTS REGARDING FEDERALLY SPONSOR RESEARCH OR DEVELOPMENT

Not applicable.

BACKGROUND OF THE INVENTION

Description of the Related Art

Reactor vessels are typically twenty to one hundred thirty feet in height and six to sixteen feet in diameter. These reactor vessels typically contain the catalyst and support materials to effect the chemical reactions necessary to convert crude oil or other feedstock material into desired products such as gasoline and diesel fuel. Following chemical reactions, spent catalyst is cleaned/removed from the reactor vessel by humans who enter, clean and prepare and reload catalyst in the reactor vessel for future reactions.

An unfortunate byproduct of these chemical reactions is the accumulation of iron sulfides and/or other hazardous chemicals (such as arsenic) on the catalyst itself. Iron sulfides are pyrophoric by nature, meaning they burn with exposure to air. As such, the combination of hydrocarbons from the refining process, the presence of pyrophoric materials, and oxygen create a volatile "Fire Triangle" combination which can lead to a fire or explosion. For this reason, spent catalyst removal is typically carried out under inert (no oxygen) conditions. With the oxygen component removed from the "Fire Triangle", there is no potential for a fire or explosion but the confined space is rendered IDLH or Immediately Dangerous to Life and Health. Of course, humans cannot live without oxygen so a life support system is required for entry into these confined spaces. These "inert, IDLH entries" are a cause for great concern at virtually every refinery or petrochemical facility because a catastrophic life support system failure may or could result in a fatality.

BRIEF SUMMARY OF THE INVENTION

To overcome some of these concerns, several objectives were identified. One objective is to create a robotic device capable of performing routine catalyst handling tasks such as vacuum removal of catalyst and support materials, and video inspection of reactor internals and catalyst bed profiles from inert confined spaces or otherwise hazardous environments. This should be accomplished without sacrificing individual project performance and/or efficiency.

Another objective is to reduce "inert man hours" by employing a robot to perform routine vacuuming and inspection tasks normally performed by vessel entry technicians with the goal being to reduce inert man hours by 20%-50% while maintaining the same level of productivity and efficiency. It is believed that humans will still be needed to perform and complete final operations.

In one embodiment, these objectives may be addressed by running a vacuum line connected to a robotic device in the reactor vessel. The robotic device has a rotating body, a cleaning arm, and stabilizing arms to stabilize the robotic device within the reactor vessel. The robotic device may be controlled/monitored from a remote control station in communication with the robotic device.

DETAILED DESCRIPTION OF THE INVENTION

Figure 1:
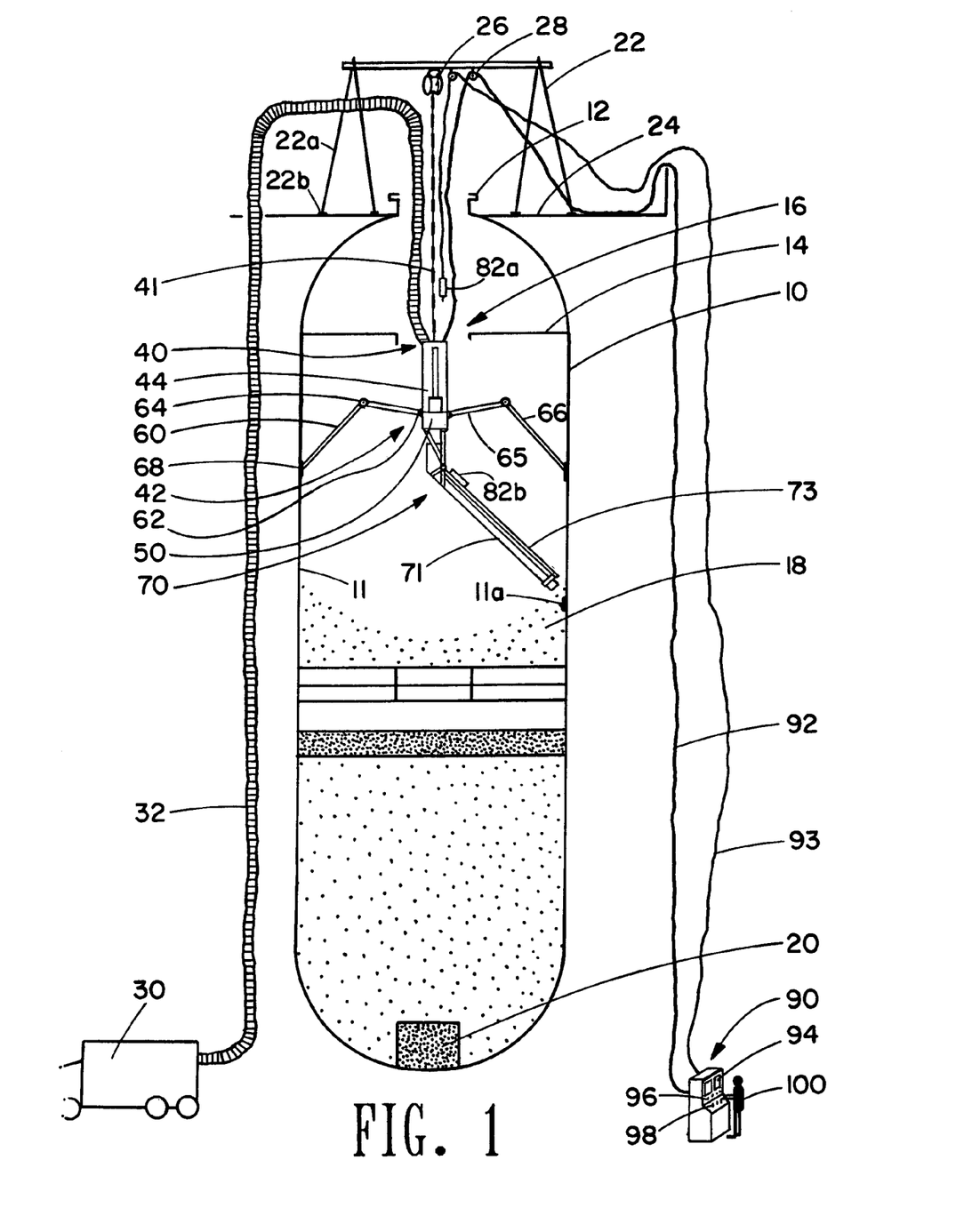
FIG. 1 is an elevational view of a reactor vessel employing one embodiment of the invention.

Referring to FIG. 1, a typical reactor vessel 10 is shown. The reactor vessel 10 has an entry manway 12, trays 14 with tray manways 16, catalyst 18 (which, as depicted, is to be removed), and an outlet screen 20 leading to a line out (not shown). An A-frame 22 is mounted on a platform 24 located near the top of the reactor vessel 10. A hoist system 26 and pulley 28 are mounted on the A-frame 22. The A-frame 22 may have legs 22a with vulcanized rubber pads 22b (between the legs 22a and the platform 24).

A vacuum source 30 which may be mobile is placed exterior to the reactor vessel 10. A vacuum line/tube 32 runs from the vacuum source 30 into the reactor vessel 10 and connects to a robotic device 40. The vacuum line 32 preferably runs into the main body 42 of the robotic device 40. The vacuum line 32 could be attached to the A-frame 22 with a hoist and pulley (not shown) mounted above the reactor vessel 10. The vacuum line 32 may, for example but without limitation, be made of stainless steel, rubber, or PVC with a durable, flexible and/or accordion-like fabrication having a four to six inch diameter.

Referring to FIGS. 1-7, the robotic device 40 generally has a main body 42 including a turret 50, stabilizing arms 60, and one or more mobile, articulatable cleaning and/or inspection arms which, for sake of brevity, will be referred to herein as the cleaning arm(s) 70 (although it could merely be an inspection arm, or merely a vacuuming arm, etc.). The robotic device 40 is used to remove/clean spent catalyst 18 and other matter such as material 11a agglomerated on the interior vessel wall(s) 11 (and/or trays 14) of the reactor vessel 10, such as, e.g., coke, char, etc. The robotic device 40 may be raised and/or lowered in the reactor vessel 10 by a cable 41 connected to a hoist system 26.

Figures 2, 3:
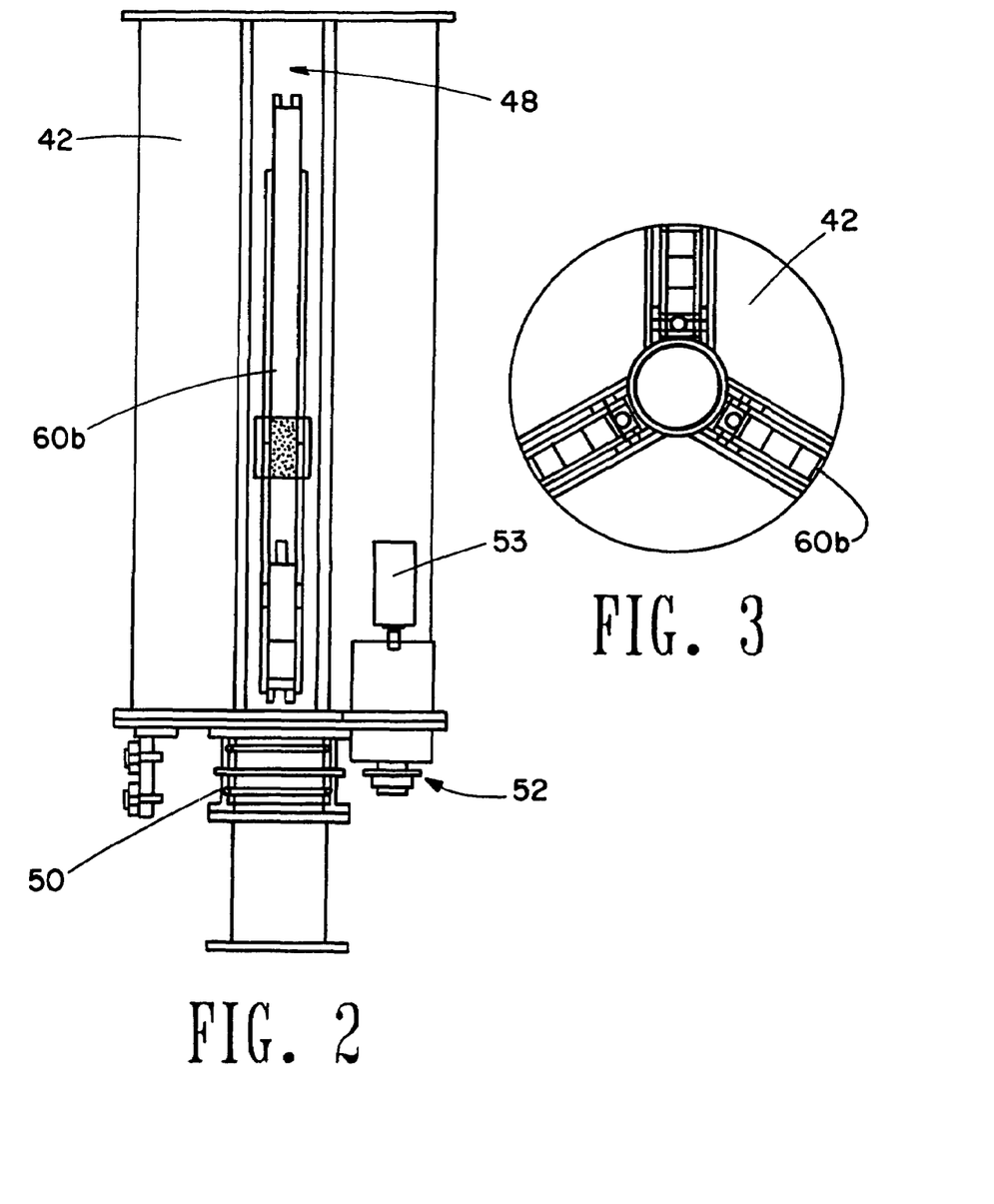
FIG. 2 is an elevational view, partially in section, of a main body and part of a turret.
FIG. 3 is a top view of FIG. 2.
Figure 4:
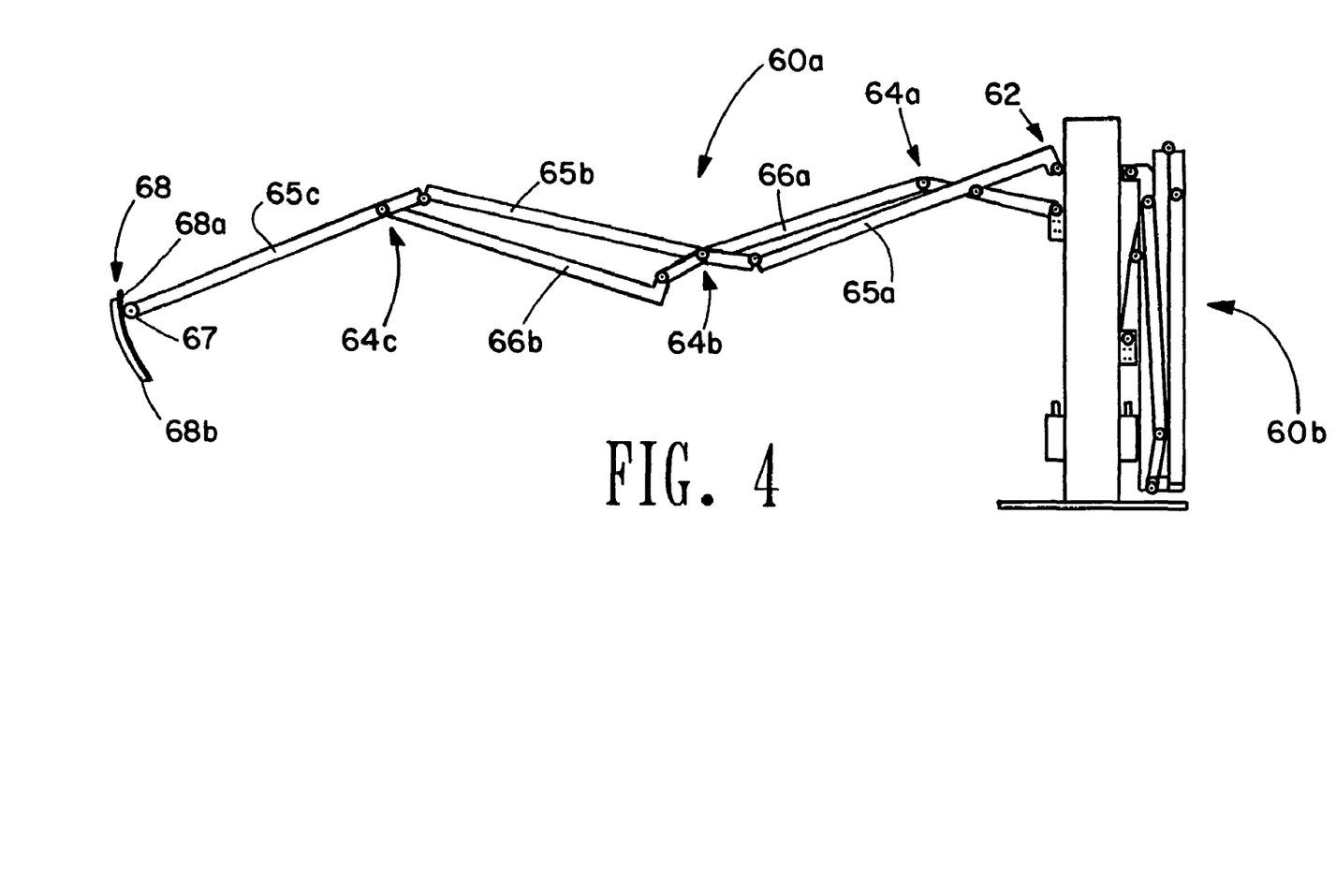
FIG. 4 is an elevational view of two stabilizing arms and part of a main body.
Figure 5:
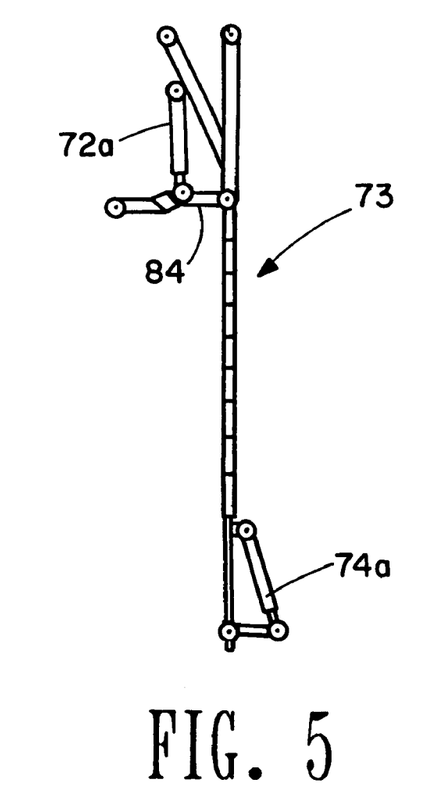
FIG. 5 is a schematic view of an articulatable frame assembly in a vertical position.
Figure 6:
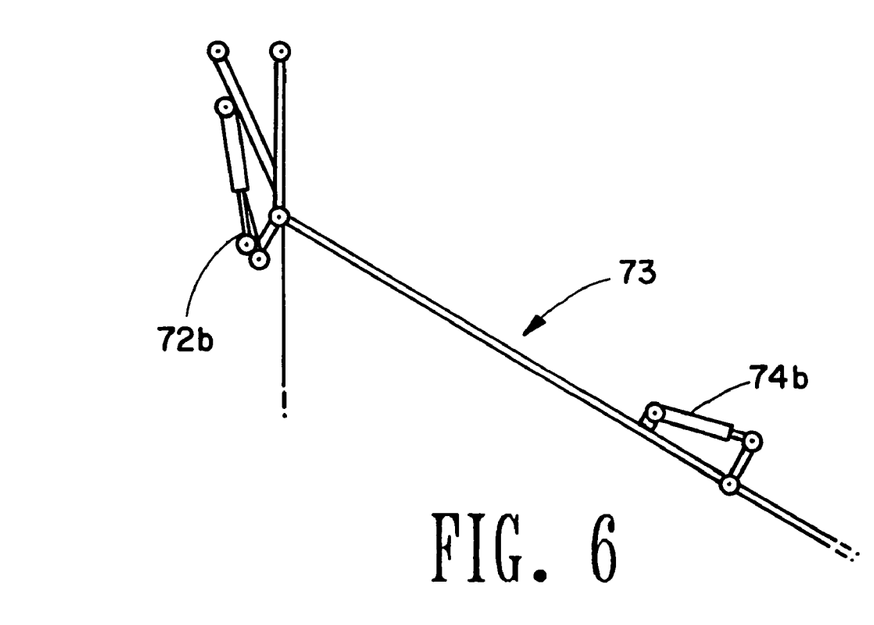
FIG. 6 is a schematic view of an articulatable frame assembly approximately forty-five degrees from the vertical position.

The main body 42 shown has a cylindrical shape. It may, for example, be made of stainless steel and have a height of about five feet. The main body 42 has an upper section 44 and a lower section/turret 50. The upper section 44 may contain all of the mechanical and electronic controls (all not shown) such as hydraulic proportional valves, air and/or hydraulic motors, control valves, etc. as known to one of ordinary skill in such art for carrying out the desired purposes of the disclosed embodiment(s).

The lower section (turret) 50 is connected to the main body 42 by a drive gear assembly (sealed, rotational joint) 52 (see FIG. 2) driven by motor 53. The turret 50 rotates in a horizontal plane and is designed to rotate approximately three hundred and sixty-five degrees in either direction. The turret 50 may have a height of about two feet.

The stabilizing arms 60 are connected to the main body 42. They leverage/wedge against the interior vessel wall(s) 11 (and/or trays 14) for the purpose of stabilizing the robotic device 40 within the reactor vessel 10. The stabilizing arms 60 have a first roatable joint 62 where the stabilizing arms 60 connect to the upper section 44 of main body 42, one or more second rotatable joints 64 (see FIG. 4) between fore-legs 65 and aft-legs 66, and grip pads 68 (which may also have a movable connection joint 67). The grip pads 68 may have a rounded lower surface 68a with vulcanized rubber pads 68b (between the rounded lower surface 68a and the interior vessel wall(s) 11). The stabilizing arms 60 function with leverage similar to umbrella or scissor arms to stabilize by wedging the robotic device 40 within the reactor vessel 10. The stabilizing arms 60a, b, and c fold and fit within respective pockets or compartments 48a, b and c within main body 42, and are powered by actuators (not shown) within the main body 42.

Figure 7:
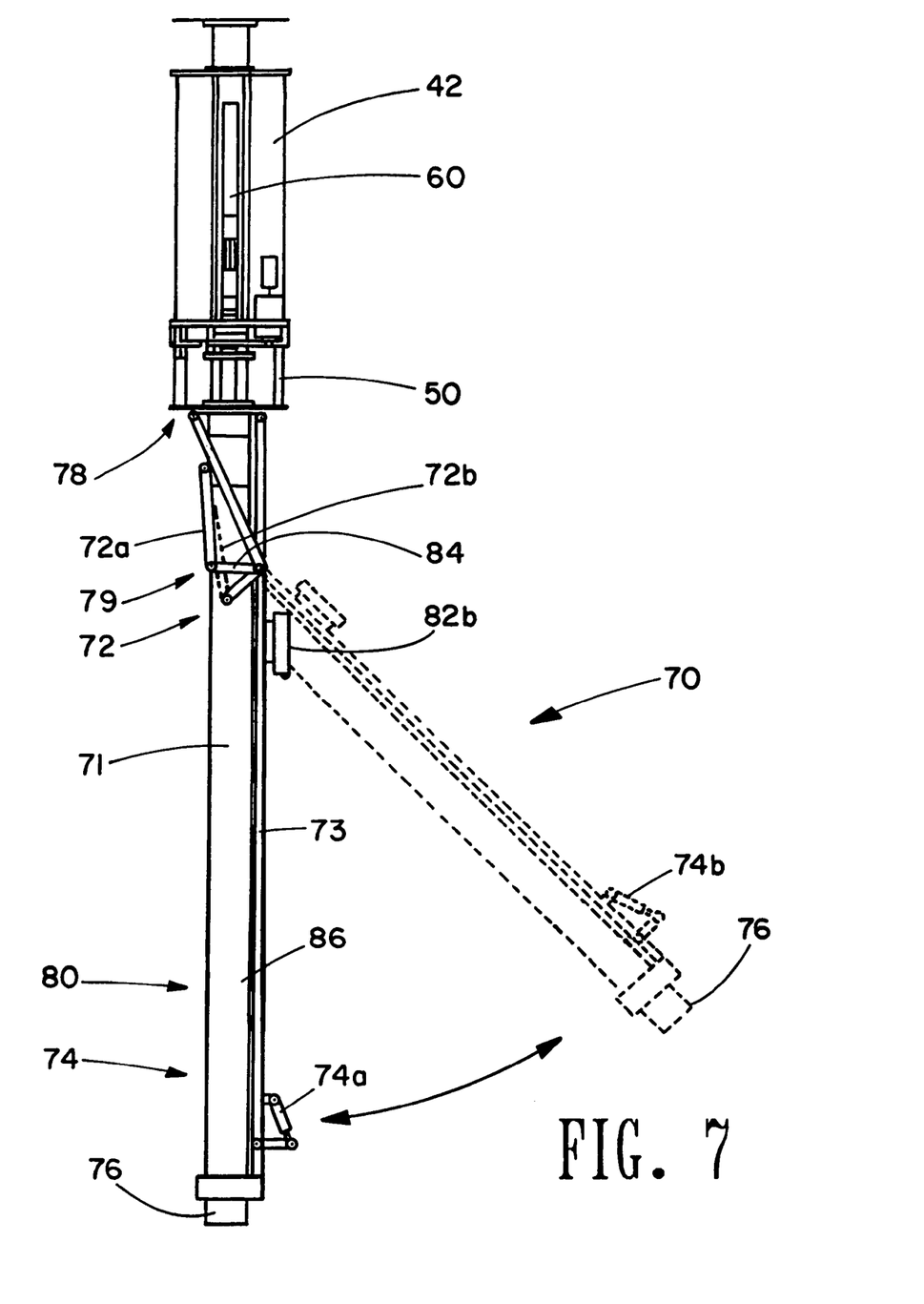
FIG. 7 is an elevational view of a robotic device shown in a vertical position and representing movement to a position approximately forty-five degrees from the vertical position.

Referring to FIGS. 1 and 7, the cleaning arm(s) 70 generally has a suction line 71 (which may be similar to vacuum line 32), an articulatable frame assembly 73, and an inspection camera 82b. Together these form at least one suction arm 72, a suction head 74 and an end tool fitting 76 at one end. The suction arm 72 is connected at one end to the turret 50 by a clamping mechanism 78 (e.g. such as that sold under the brand name CAMLOCK). The turret 50 rotates in a vertical plane. The suction arm 72 has a swivel joint or first knuckle 79. The swivel joint 79 is activated by first ram(s) 72a and linkage(s) 84 connected in the articulatable frame assembly 73. The other end of the suction arm joins to the suction head 74 at a swivel joint or second knuckle 80. The swivel joint 80 is activated by second ram(s) 74a and linkage(s) 86 connected in the articulatable frame assembly 73.

Each swivel joint 78, 79 and 80 can be controlled independently. The entire cleaning arm 70 should initially be vertical to allow the robotic device 40 to move through the entry manway 12, and/or trays 14 with tray manways 16 as desired. Then, to clean and/or inspect the connection angle at each swivel joint 78, 79 and 80 is adjustable. For example, the swivel joints 79 and 80 may each rotate about forty-five to sixty-five degrees via the respective first ram(s) 72a (e.g. from position shown at 72a to position 72(b) and the second ram(s) 74a. The entire cleaning arm 70 may articulate from the turret 50 about, for example, seven to eight feet (depending upon the reactor/job size) to reach the reactor interior of vessel wall(s) 11. However, to account for the variety of sizes of reactor vessels 10 or applications which exist in the industry, the cleaning arm 70 may be made in different sizes. The cleaning arm(s) 70 of different sizes are interchangeable for connection to and use with the main body 42 of the robotic device 40, and the manner of connection/removal of same would be known to one of ordinary skill in such art for carrying out the desired purposes of the disclosed embodiment(s).

A gimble joint (not shown) may also be implemented between the turret 50 and the cleaning arm 70 allowing the cleaning arm 70 to self-align as it is assembled prior to being lowered into a reactor vessel 10.

Video camera 82b may be attached to the robotic device 40 by attaching to articulatable frame assembly 73 along, for example, the suction arm 72 and/or along the suction head (see FIG. 1A). A video camera 82a may also, for example, be suspended within the reactor vessel 10 by a cable 93 and pulley 26, and/or at manway 12 (not shown).

Referring to FIGS. 7, 9 10 and 11, the end tool fitting 76 on the cleaning arm(s) 70 may merely be a vacuum nozzle endpiece which may be threaded at end 76a to the suction line 71, or it may have the following optional attachments: a scraper plate with teeth (or a hydraulic scraper piece) 77a mounted on the end of the end tool fitting 76 to aid in moving material (e.g. agglomerated material 11a) for easier removal; a line and fitting 77b may be connected through the end tool fitting 76 for introducing a nitrogen/air induction nozzle to enhance vacuum capability by providing a carrier medium for vacuuming solids; lighting (which in the illustrated embodiment actually comprises part of the camera 82b but may, for example, be separate or external low voltage lighting); a sprayer nozzle 77e utilizing, for example, a T-fitting attachment 77d, can be used for the chemical passivation of reactor internals to prevent polythionic acid cracking; a pick and/or rake (similar to scraper plate with teeth 77a) to pick, loosen and/or break apart hard or agglomerated material; a tray and tray bolt removal feature/assembly such as that used commercially in undersea operations; and/or an auger device 77c (FIG. 9) to aid in the loosening of agglomerated or fused catalyst and which may, for example, be pneumatically powered.

The robotic device 40 may be programmed for self control although presently it is preferred to operate the robotic device 40 from a remote control station 90. The remote control station 90 is external to the reactor vessel 10 and communicates with the robotic device 40 by electromagnetic waves or communication line(s) 92. The remote control station 90 has one or more monitors 94 for viewing images from camera(s) 82; has camera controls 96, e.g., zoom in or out; and/or has one or more joysticks 98 to control, for example, extendretract, up-down, move scraper, rotate turret left or right, etc.

Figure 8:
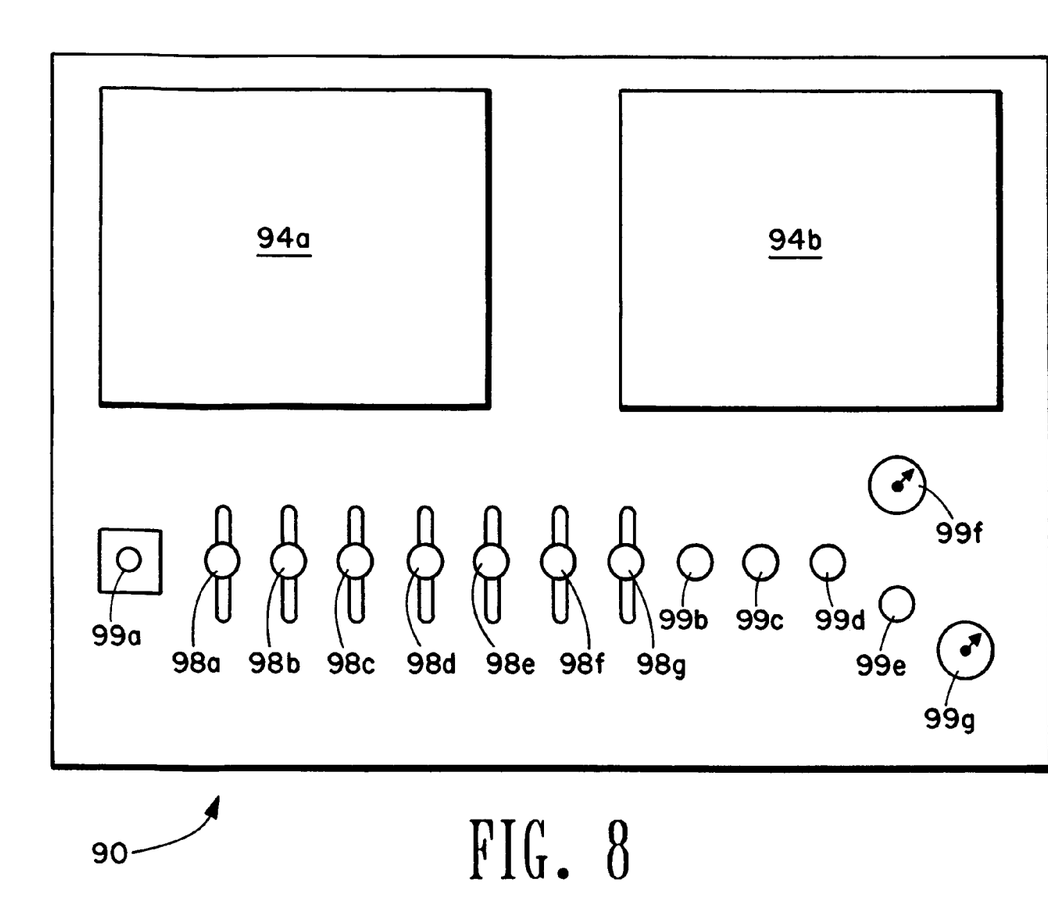
FIG. 8 is a schematic view of a control panel.
Figure 9:
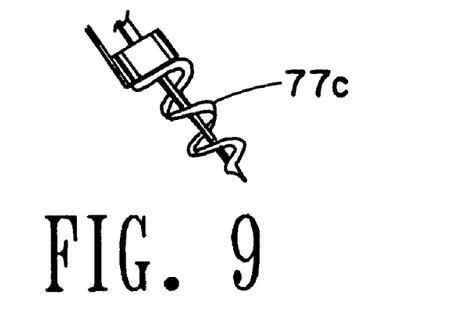
FIG. 9 is a schematic view of an auger device.
Figure 10:
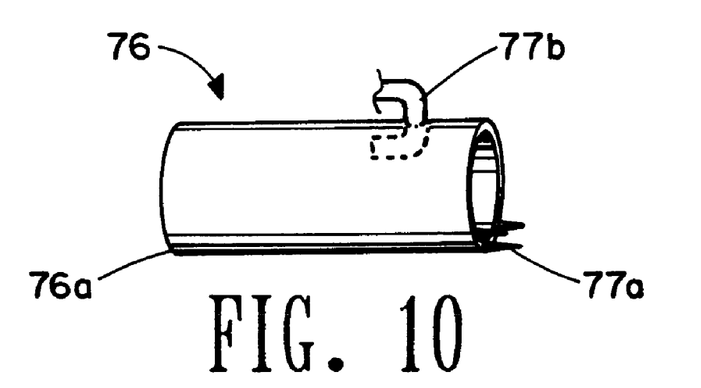
FIG. 10 is a perspective view of an end tool filling.
Figure 11:
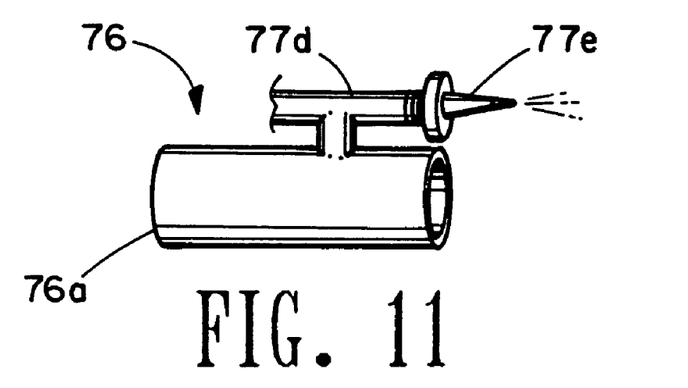
FIG. 11 is a perspective view of another end tool fitting.
Figure 12:
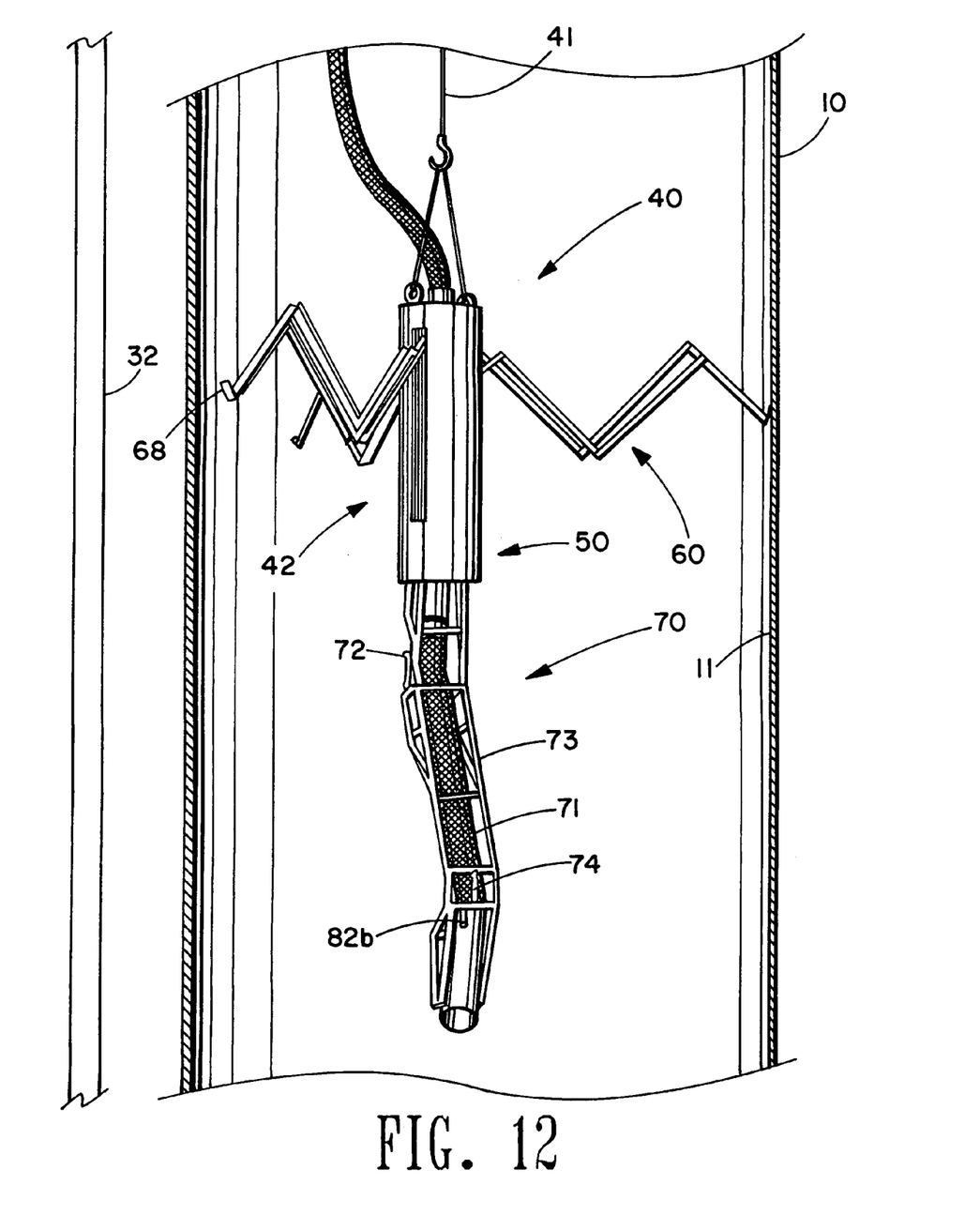
FIG. 12 is a perspective view of a reactor vessel employing another embodiment of the invention.

Referring to FIG. 8, in one embodiment the remote control station 90 may have monitors 94a and 94b in respective communication with video cameras 82a and 82b; joysticks 98a, 98b and 98c for moving the respective stabilizing arms 60a, 60b and 60c in or out; joysticks 98d for moving the suction arm 72 in or out; joystick 98e for moving the suction head 74 in or out; joystick 98f for rotating the turret 50 clockwise or counterclockwise; joystick 98g for moving the robotic device 40 up or down in the reactor vessel 10 such as by an air hoist 26; a controller 99a for moving all three stabilizing arms 60a, 60b and 60c simultaneously; a hydraulic power start button 99b; a hydraulic power stop button 99c; a main power "kill" switch 99d; a hydraulic pressure adjustment knob 99e; a pressure gauge 99f; and a gauge 99g showing nitrogen pressure to the induction fitting 77b.

In use the operator 100 will lower/hoist the robotic device 40 down through the manway 12 into the reactor vessel 10; operate the robotic device 40 from the remote control station 90 to vacuum (and/or perform other optional functions) the interior of the reactor vessel 10 and to remove the manways from various layers of trays 14 mounted within the reactor vessel 10. After robotic work is completed, humans may enter to inspect and perform residual and fine clean-up operations.

Other options which may be implemented into the preferred embodiment, include that system power can be hydraulic, air/pneumatic, low and/or high voltage electricity, and/or any combination thereof; separate lighting (not shown) can be lowered into the reactor vessel 10 to provide additional work or video lighting; a separate camera (not shown) can be mounted at the top of the manway 12 (e.g. on the vacuum line 32) looking down into the vessel 10; and/or separate environmental analyzer(s) (not shown) can be lowered into the reactor vessel 10 to take in-vessel atmospheric readings.

The robot can be used for video inspections of many types of confined spaces or hazardous environments including vessels, tanks, cargo holds, drums, etc., with or without a suction line 71. Hazardous environments can be roughly defined as environments beyond OSHA defined parameters, environments where temperatures exceed 110 degrees Fahrenheit, inert environments, below freezing environments, etc.

In conclusion, therefore, it is seen that the present invention and the embodiments disclosed herein are well adapted to carry out the objectives and obtain the ends set forth. Certain changes can be made in the subject matter without departing from the spirit and the scope of the invention(s). It is realized that changes are possible within the scope of the invention(s) and it is further intended that each element or step recited is to be understood as referring to all equivalent elements or steps. The description is intended to cover the invention(s) as broadly as legally possible in whatever form it may be utilized.

What is claimed is:

1. An apparatus for cleaning catalyst selected or use in a group of confined spaces, consisting of inert spaces or other hazardous environment spaces, comprising:
   a reactor vessel;
   a robotic device having a cleaning arm connected to said robotic device;
   wherein said robotic device has a main body, a means for stabilizing said robotic device connected to the main body, a turret connected to the main body, and wherein said cleaning arm is connected to said turret;
   wherein said cleaning arm includes an articulatable frame assembly and a suction line mounted to said articulatable frame assembly
   wherein sad robotic device is within the reactor vessel;
   a vacuum line connected through the reactor vessel and through said robotic device to said cleaning arm; and
   the reactor vessel being free from having a human operator within the reactor vessel.

2. The apparatus according to claim 1, further including a fitting connected to said suction line; and
   a nozzle connected through the fitting.

3. The apparatus according to claim 1, further comprising:
   a clamping mechanism connecting said suction line to said turret;
   a first knuckle activated by a first ram and a linkage connected in said
   articulatable frame assembly; and
   a second knuckle activated by a second ram and a second linkage connected in said articulatable frame assembly.

4. An apparatus for cleaning catalyst selected for use in a group of confined spaces, consisting of inert spaces or other hazardous environment spaces, comprising:
   a reactor vessel;
   a robotic device having a cleaning arm connected to said robotic device;
   wherein said robotic device has a main body, a means for stabilizing said robotic device connected to the main body, a turret connected to the main body, and wherein said cleaning arm is connected to said turret;
   wherein said robotic device is within the reactor vessel;
   a vacuum line connected through the reactor vessel and through said robotic device to said cleaning arm;
   wherein said cleaning arm includes an articulatable frame assembly and a suction line mounted to said articulatable frame assembly;
   the reactor vessel being free from having a human operator within the reactor vessel;
   a clamping mechanism connecting said suction line to said turret;
a first knuckle activated by a first ram and a linkage connected in said articulatable frame assembly; and
   a second knuckle activated by a second ram and a second linkage connected in said articulatable frame assembly.

* * * * *